US007562105B2

United States Patent
Liu et al.

(10) Patent No.: US 7,562,105 B2
(45) Date of Patent: Jul. 14, 2009

(54) METHODS AND APPARATUS FOR GENERATING A DELAY USING A COUNTER

(75) Inventors: Yan Liu, Shanghai (CN); Lechong Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 882 days.

(21) Appl. No.: 10/723,668

(22) Filed: Nov. 26, 2003

(65) Prior Publication Data

US 2005/0114416 A1  May 26, 2005

(51) Int. Cl.
G06F 1/02 (2006.01)
G06F 1/04 (2006.01)
(52) U.S. Cl. ...................... 708/270; 713/502
(58) Field of Classification Search .......... 708/270, 708/672; 713/502
See application file for complete search history.

(56) References Cited

U.S. PATENT DOCUMENTS

| 4,928,270 | A | * | 5/1990 | Chovin et al. ................ 368/82 |
| 5,258,656 | A | * | 11/1993 | Pawlick ....................... 307/141 |
| 5,303,279 | A | * | 4/1994 | Fujii ........................... 377/51 |
| 6,064,646 | A | | 5/2000 | Shal et al. |
| 6,597,735 | B1 | * | 7/2003 | Baba ........................... 375/238 |
| 6,959,397 | B2 | * | 10/2005 | Cafaro et al. ................ 713/503 |
| 7,047,270 | B2 | * | 5/2006 | Agarwala et al. ............. 708/498 |

FOREIGN PATENT DOCUMENTS

JP            06060201 A      3/1994

OTHER PUBLICATIONS

International Search Report corresponding to International Application No. PCT/US2004/037772, Mar. 6, 2006, 3 sheets.
Written Opinion of the International Searching Authority corresponding to International Application No. PCT/US2004/037772, Mar. 6, 2006, 6 sheets.
International Preliminary Report on Patentability corresponding to International Application No. PCT/US2004/037772, mailed Jun. 8, 2006, 7 sheets.
Japanese Office Action issued on Mar. 17, 2009, Japanese Intellectual Patent Office, Text of Office Action (English Translation) in Japanese patent application No. 2006-54127, 2 pages.

* cited by examiner

*Primary Examiner*—Chuong D Ngo
(74) *Attorney, Agent, or Firm*—Hanley, Flight and Zimmerman, LLC

(57) ABSTRACT

Methods, apparatus, and articles of manufacture for generating a delay time using a counter are disclosed. In particular, the methods, apparatus, and articles of manufacture determine a number of loops value associated with the delay time and at least one characteristic value associated with a counter. A remaining count value is then determined based on the number of loops value. The delay time is generated with the counter based on the number of loops value and the remaining count value.

40 Claims, 5 Drawing Sheets

METHODS AND APPARATUS FOR
GENERATING A DELAY USING A COUNTER

FIELD OF THE DISCLOSURE

The present disclosure relates generally to processor systems and, more particularly, to methods, apparatus, and articles of manufacture for using a counter to generate delay times within processor systems.

BACKGROUND

It is well known that operation of a processor system is dependent on significant design considerations relating to, for example, processor core design, instruction set implementations and hardware compatibilities. Although many design considerations are generally related to the hardware components of a processor system, some of the design considerations are related to the performance of those hardware components during a runtime phase of the processor system.

Generating precise delay times or timings is a hardware-related design consideration that is of particular importance during the runtime phase of a processor system. Delay times are generally associated with the various parts of a processor system, including hardware, firmware, software, and combinations thereof. For example, initializing certain peripherals during a hardware initialization process often requires the generation of precise delay times. In particular, initializing a peripheral may require register bits within the peripheral to be set in a consecutive manner according to a precisely controlled time sequence. Often, the controlled time sequence is implemented using firmware that, when executed, generates predetermined delay times and/or timing interrupts.

Another example of the importance of timings or delay times includes peripheral communications in which a processor system communicates with an external peripheral having specific timing requirements. Such timing requirements may include, for example, polling a device at specific time intervals.

Delay times or timings are often implemented using interrupts such as, for example, timer interrupts and clock interrupts. In general, interrupts are reliable and effective resources that are often used to generate appropriate timings or delay times. However, interrupts are not always available during a runtime phase of a processor system, thereby making it difficult to generate appropriate timings or delay times without these resources.

One example scenario in which interrupts are not available may occur in a pre-boot environment of a processor system when the processor and peripherals are initialized in preparation for booting an operating system. In particular, interrupts are not available in the pre-boot environment during the execution of an extensible firmware interface (EFI) conformant to the Extensible Firmware Interface Specification, version 1.02, published Dec. 12, 2000 by Intel Corporation, Santa Clara. As a result, generating precise timings or delay times within the pre-boot environment without the use of interrupts is often not feasible.

DETAILED DESCRIPTION

Figure 1:
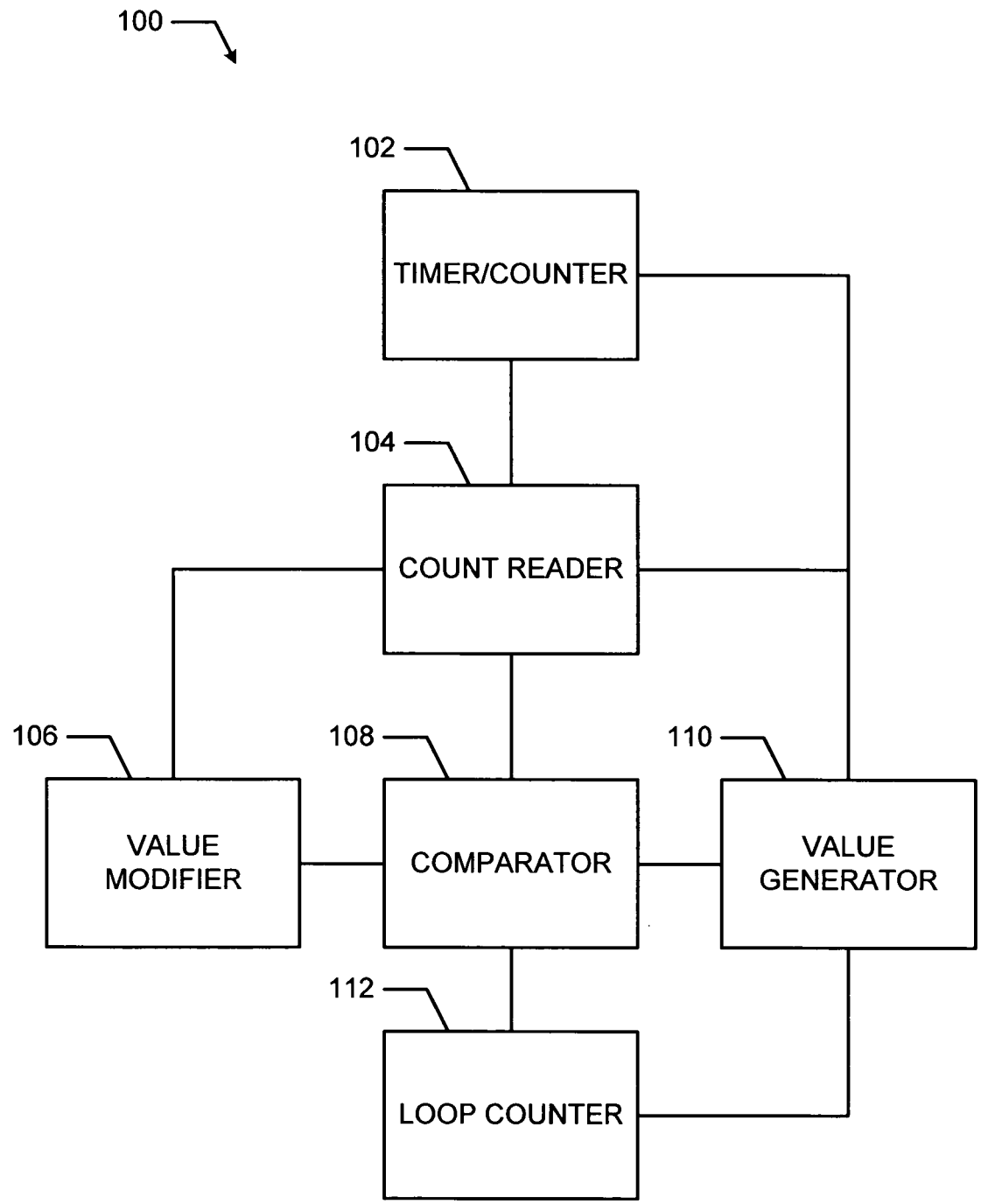
FIG. 1 is a functional block diagram of an example system that may be used to generate a desired delay time.

FIG. 1 is a functional block diagram of an example system 100 that may be used to generate a desired delay time. However, before discussing the system 100 of FIG. 1 in detail, it is important to recognize that the structure shown in FIG. 1 may be implemented using any desired combination of hardware and/or software. For example, one or more integrated circuits, discrete semiconductor components, or passive electronic components may be used. Additionally or alternatively, some or all, or parts thereof, of the structure may be implemented using instructions, code, or other software and/or firmware, etc. stored on a machine readable medium that, when executed by, for example, a processor system (e.g., the processor system 610 of FIG. 6), perform the methods disclosed herein (e.g., the methods shown in FIGS. 4 and 5).

In general, the example system 100 uses a counter (e.g., a timer/counter) to generate a precise delay time without the use of interrupts or the like. As a result, the example system 100 may be used, for example, to generate precise delay times within a pre-boot environment of a processor system or any other runtime phase or operational state in which interrupts and/or other timing resources may not be available. More specifically, as described in greater detail below, the example system 100 uses the known characteristics of a counter (or timer/counter) such as, for example, the minimum and maximum count values and the amount of time required for the counter to count from the minimum to the maximum count value, to generate a precise delay time.

In some examples, the example system 100 computes a number of loops value (e.g., timer/counter rollover events) and a remaining or residual count value required to generate a desired delay time using the counter. The example system 100 may also be configured to read the value (i.e., count value) of the counter in, for example, a polling process. The example system 100 may then perform comparisons based on obtained count values and computed values to generate a delay time.

Now turning in detail to FIG. 1, the example system 100 includes a timer/counter 102, a count reader 104, a value modifier 106, a comparator 108, a value generator 110, and a loop counter 112, all of which may be communicatively coupled as shown. The timer/counter 102 may be a non-resetable or resetable counter and/or timer of any desired bit-length (e.g., an 8-bit timer/counter, a 16-bit timer/counter, etc.) that generates count values by incrementing or decrementing a count value. In particular, the timer/counter 102 may be configured to increment a count value from a minimum count value to a maximum count value and to generate rollover events as described in greater detail in connection with FIG. 2 below. The timer/counter 102 is communicatively coupled to the count reader 104 and allows the count reader 104 to read its count values and/or is configured to send its count values to the count reader 104. Additionally, the timer/ counter 102 is communicatively coupled to the value generator 110 and provides characteristic values of the timer/counter 102 to the value generator 110.

As shown in FIG. 1, the count reader 104 is communicatively coupled to the timer/counter 102, the value modifier 106, the comparator 108, and the value generator 110. The count reader 104 obtains a count value from the timer/counter 102 and may be configured to make a single reading (i.e., obtain a single count value) of the timer/counter 102 and/or to make multiple readings of the timer/counter 102 via a polling process or any other desired technique for obtaining count values. The count reader 104 may also be configured to convey the count value from the timer/counter 102 to the value modifier 106, the comparator 108, and the value generator 110.

The value modifier 106 may be configured to modify and/or update values such as, for example, count variable values that, as described in greater detail below, may be used to store count values of the timer/counter 102 read by the count reader 104. In particular, the value modifier 106 may be configured to receive or retrieve count values from the count reader 104 (e.g., the count values read from the timer/counter 102) and comparison results from the comparator 108. The value modifier 106 may modify or update, for example, count variable values based on the count values and/or the comparison results. Additionally, the count variable values may be communicated to the comparator 108.

The comparator 108 may be configured to receive or retrieve count values from the count reader 104, variable count values from the value modifier 106, delay time generation values from the value generator 110, and loop count values from the loop counter 112. The comparator 108 may be configured to perform comparisons based on the count values and to generate comparison results based on the comparisons. Additionally, the comparison results may be communicated to the value modifier 106, the value generator 110, and the loop counter 112.

The value generator 110 may be configured to generate values such as, for example, delay time generation values associated with generating a desired delay time. Additionally, the value generator 110 may be configured to receive or retrieve count values from the count reader 104 and timer/counter characteristic values from the timer/counter 102. Timer/counter characteristic values may include a minimum count value, a maximum count value, and a loop period value (i.e., time required to increment a count value from the minimum count value to the maximum count value) of the timer/counter 102. The value generator 110 may be configured to generate, for example, delay time generation values based on the count values and the timer/counter characteristic values. The delay time generation values may be communicated to the comparator 108 and the loop counter 112.

In general, the loop counter 112 is configured to receive or retrieve delay time generation values from the value generator 110 and comparison results from the comparator 108. Additionally, the loop counter 112 may be configured to generate loop count values that are associated with a number of rollover events generated by the timer/counter 102. The number of rollover events generated by the timer/counter 102 may be detected via a comparison operation performed by the comparator 108. The loop counter 112 generates loop count values by decrementing or incrementing a number of loops value based on, for example, the comparison results and the delay time generation values.

Figure 2:
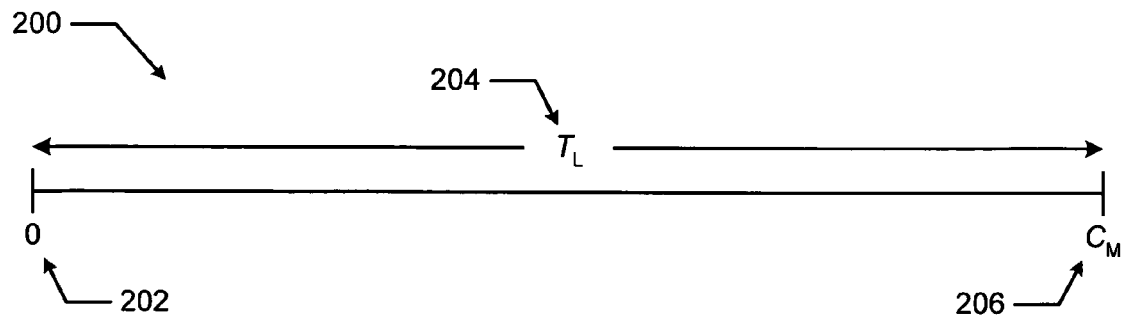
FIG. 2 is an example count line and characteristic values of a timer/counter associated with generating a desired delay time using the time/counter of FIG. 1.

FIG. 2 is an example count line 200 and characteristic values of a timer/counter (e.g., the timer/counter 102 of FIG. 1) associated with implementing a desired delay time using the timer/counter 102 of FIG. 1. In general, the count line 200 diagramatically represents the relationship between a count value stored in the timer/counter 102 and elapsed time. The relationship between the count value and elapsed time for a particular timer/counter may be, for example, a function of the rate at which the timer/counter represented by the count line 200 is clocked.

As shown in FIG. 2, the example count line 200 is characterized by a zero count value 202, a loop period value $T_L$ 204, and a maximum count value $C_M$ 206. These characteristic values may be used, for example, during a runtime phase to implement a desired delay time ($T_D$). By way of example only, the example count line 200 is described as being associated with the timer/counter 102 of FIG. 1. However, the example count line 200 may be applied in a similar manner to any other counter, timer, or timer/counter. Continuing with the example, the zero count value 202 may be a count value of zero or the minimum value that can be represented by the timer/counter 102. The maximum count value $C_M$ 206 is the maximum value that the timer/counter 102 can count prior to a rollover event. A rollover event occurs when the timer/counter 102 reaches its maximum count value $C_M$ 206 and the subsequent count value is equal to the zero count value 202 (i.e., $C_M+1=0$). For example, the maximum count value $C_M$ 206 of an 8-bit counter is equal to the quantity $2^8-1$ (i.e., 255). When such an 8-bit counter reaches a count value of two hundred and fifty-five (i.e., the maximum count value $C_M$ 206), a rollover event occurs when the 8-bit counter is incremented to the next count value of the 8-bit counter, which is the zero count value 202. The loop period value $T_L$ 204 for the 8-bit counter is equal to the amount of time required for the timer/counter 102 (FIG. 1) to increment the count value from its zero count value 202 to its maximum count value $C_M$ 206.

Figure 3:
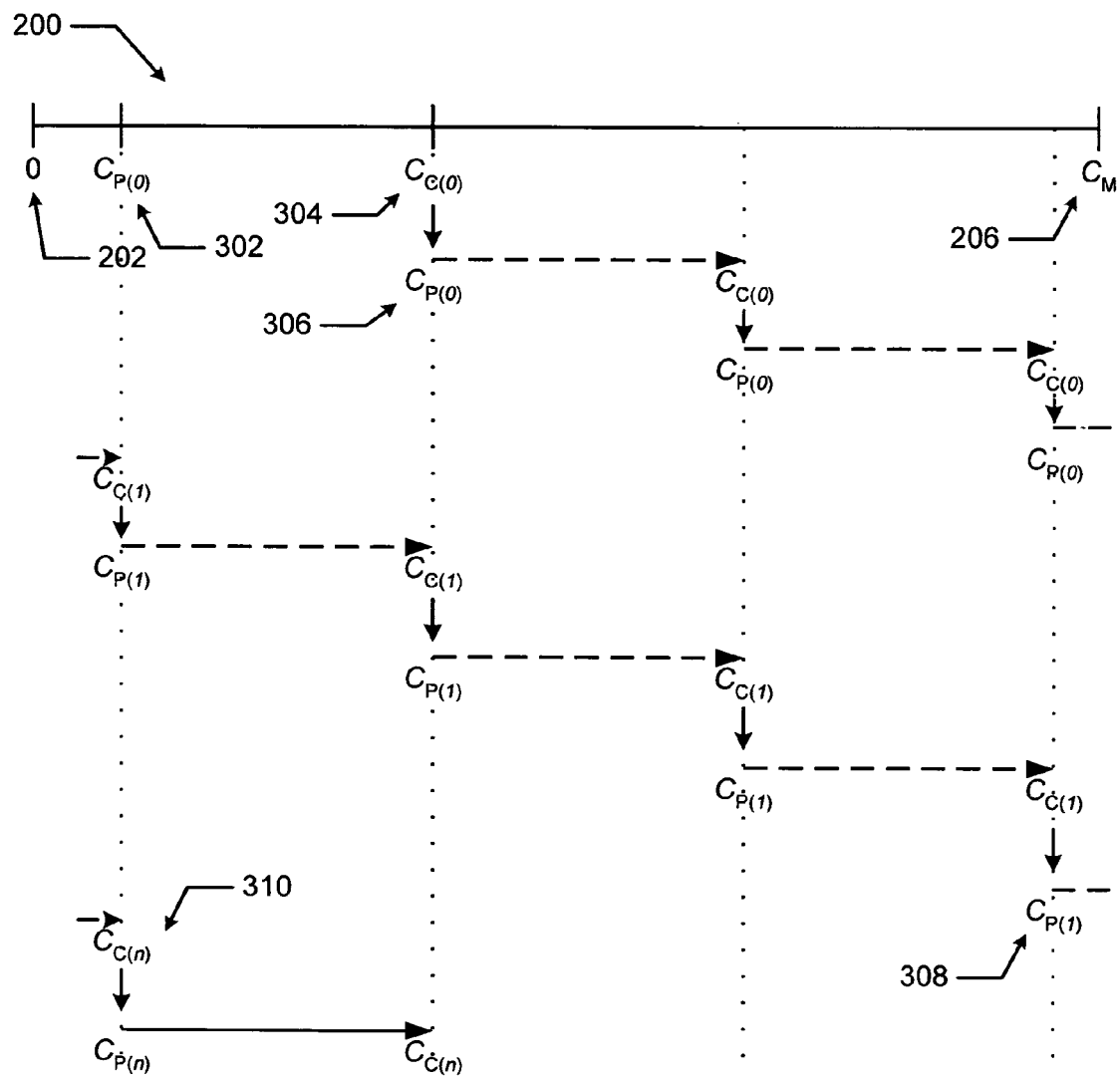
FIG. 3 is a diagram of an example counter polling process based on the example count line of FIG. 2 and a plurality of count values.

FIG. 3 is a diagram of an example counter polling process based on the example count line 200 of FIG. 2 and a plurality of count values. The counter polling process of FIG. 3, when used in combination with a timer/counter unit such as, for example, the timer/counter 102 of FIG. 1 enables the generation of a desired delay time. The counter polling process depicted in FIG. 3 includes a plurality of count values that are obtained during a runtime phase by polling (i.e., reading or otherwise obtaining) a running count value of the timer/counter 102 during one or more counter cycles or loops. A series of sequential count values is generated by the timer/counter 102 when it is enabled and incrementing a count value or running. Each running count value (i.e., a particular count value within the series of count values) is associated with a previous count value $C_P$ (e.g., previous count values 302, 306, and 308) and/or a current count value $C_C$ (e.g., current count values 304, 308, and 310). The current count value $C_C$ is obtained by reading a current value of the timer/counter 102. The previous count value $C_P$ is the current count value $C_C$ obtained during the preceding reading of the running count value of the timer/counter 102.

Each previous count value $C_P$ and current count value $C_C$ is stored in a previous count variable value $X_{CP}$ and a current count variable value $X_{CC}$, respectively (not shown). The count variable values $X_{CP}$ and $X_{CC}$ may be overwritten by respective previous count values $C_P$ and current count values $C_C$ after each reading or polling of the timer/counter 102.

An example reading of the timer/counter 102 is shown as the current count value $C_C$ 304 and the previous count value $C_P$ 306. In particular, the running count value of the timer/counter 102 is read to obtain the current count value $C_C$ 304, which is stored in the current count variable value $X_{CC}$. As will be described in greater detail in connection with FIGS. 4 and 5 below, the current count variable value $X_{CC}$ is compared to a previous count value $C_P$ (i.e., the previous count value $C_P$ 302) that is stored in the previous count variable value $X_{CP}$. Based on the comparison, a subsequent previous count value $C_P$ such as, for example, the previous count value $C_P$ 306 may be set equal to the current count value $C_C$ 304 and stored in the previous count variable value $X_{CP}$, thereby overwriting the previous count value $C_P$ 302. In this manner, a processor system (e.g., the processor system 610 of FIG. 6) may implement a desired delay time by polling the timer/counter 102 (FIG. 1) to obtain previous count values $C_P$ and current count values $C_C$.

Counter cycles or loops are depicted in FIG. 3 using the subscripts (0), (1), and (n), where the value n represents a number of counter cycles or loops. By way of example, the counter polling process of FIG. 3 depicts two counter cycles or loops bound by the previous count value $C_P$ 302 and the current count value $C_C$ 310. Additionally, each counter cycle includes one rollover event. A rollover event may be detected by comparing a current count value $C_C$ to a previous count value $C_P$. If the previous count value $C_P$ is greater than the current count value $C_C$ (as illustrated by the previous count value $C_P$ 308 and the current count value $C_C$ 310), a rollover event has been generated or has occurred.

Figure 4:
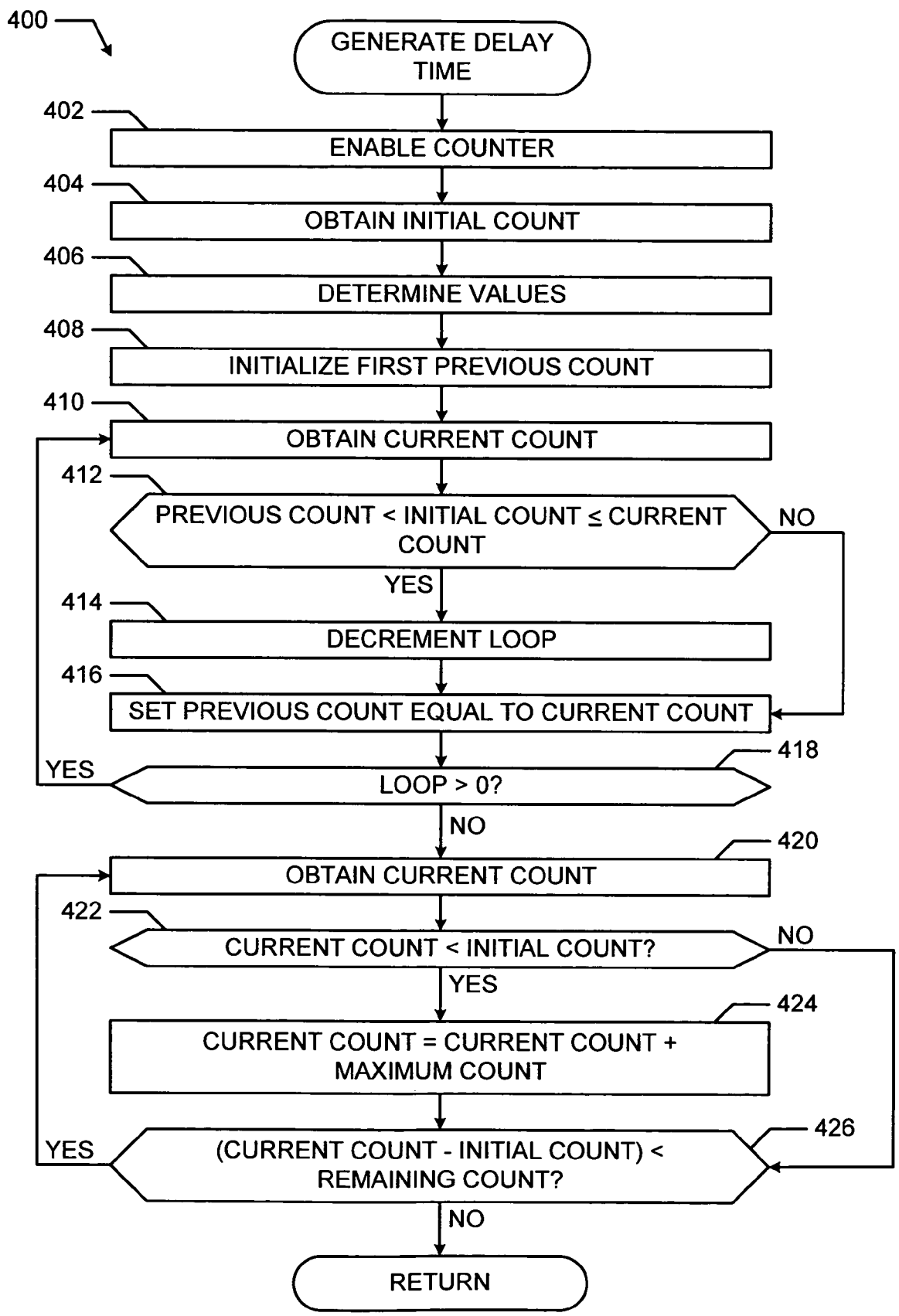
FIG. 4 is a flow diagram of an example delay time generation method that may be implemented by the example system of FIG. 1.

FIG. 4 is a flow diagram of an example delay time generation method 400 that may be implemented by the example system 100 of FIG. 1. The example delay time generation method 400 may be performed during a pre-boot phase or initialization process (i.e., in a non-interrupt environment) and/or during any other runtime phase. A desired delay time may be implemented by obtaining timer/counter characteristic values (e.g., the loop period value $T_L$ 204 and the maximum count value $C_M$ 206 described in connection with the example count line 200 of FIG. 2 above) and the count variable values $X_{CP}$ and $X_{CC}$ described in connection with FIG. 3 above.

Additional values associated with generating a desired delay time may be obtained and/or determined using the example delay time generation method 400. The additional values may include an initial count value $C_I$, a delay count value $C_D$, a number of loops value L, and a remaining count value $C_R$, all of which are described in greater detail below. Values may be determined during a runtime phase or prior to a runtime phase, stored in a memory, and retrieved multiple times during a runtime phase. In addition, values may be determined a number of ways such as, for example, calculating them using a processor system and/or retrieving them from a memory.

The initial count value $C_I$ is associated with a first count value obtained by reading the count value of a timer/counter such as, for example, the timer/counter 102 of FIG. 1. Additionally, the initial count value $C_I$ may be any value that can be represented by the timer/counter 102 and that is greater than or equal to the zero count value 202 (FIG. 2) and less than or equal to the maximum count value $C_M$ 206 (FIG. 2) (i.e., zero count value $202 \leq C_I \leq C_M 206$). The initial count value $C_I$ may be used to determine the delay count value $C_D$, the number of loops value L, and the remaining count value $C_R$ as described in connection with Equations 1-3 below.

The delay count value $C_D$ determines the number of counts of the timer/counter 102 that are required to generate a desired delay time. For example, if the desired delay time is equal to the amount of time indicated by the loop period value $T_L$ 204 (FIG. 2), the delay count value $C_D$ is set equal to the maximum count value $C_M$ 206. In that case, the timer/counter 102 increments a number of counts equal to the maximum count value $C_M$ 206 to implement the desired delay time.

The number of loops value L is defined by the number of times that the timer/counter 102 reaches a specific count value and is generally associated with a number of rollover events. For example, if the specific count value is defined as the zero count value 202 (FIG. 2), the number of loops value L is equal to the number of times that the count value of the timer/counter 102 reaches the zero count value 202 (FIG. 2). In this manner, the timer/counter 102 generates a number of rollover events equal to the number of loops value L. Additionally, by way of example, the number of loops value L is shown in FIG. 3 by the subscripts (0), (1), and (n). As described above in greater detail in connection with FIG. 3, the subscript value n is equal to a number of counter cycles or loops.

The remaining count value $C_R$ is any value that can be represented by the timer/counter 102 (FIG. 1) and that is greater than or equal to the zero count value 202 and less than or equal to the maximum count value $C_M$ 206. In general, the remaining count value $C_R$ is used following a final loop of the timer/counter 102 to determine when the desired delay time has been reached. In other words, the desired delay time is generated by allowing the timer/counter 102 to complete a number of counter cycles or loops equal to the number of loops value L, after which comparisons are performed based on the remaining count value $C_R$ and counter values obtained by polling the timer/counter 102 to determine if the desired delay time has been reached.

Now turning in detail to the example delay time generation method 400 of FIG. 4, the timer/counter 102 (FIG. 1) is enabled (block 402), thereby causing the timer/counter 102 to run or begin incrementing a count value. An initial count value $C_I$ is obtained by reading the running count value of the timer/counter 102 (block 404). Delay time generation values, including the delay count value $C_D$, the number of loops value L, and the remaining count value $C_R$ are then determined (block 406) by, for example, the value generator 110 (FIG. 1).

The delay count value $C_D$ may be determined based on the delay time value $T_D$, the loop period value $T_L$ 204, and the maximum count value $C_M$ 206 according to Equation 1 below.

$$C_D = \left(\frac{T_D}{T_L} \cdot C_M\right) \qquad \text{Equation 1}$$

As shown in Equation 1, the delay count value $C_D$ may be determined by dividing the delay time value $T_D$ by the loop period value $T_L$ 204 and multiplying the result by the maximum count value $C_M$ 206.

In general, the number of loops value L may be determined based on the delay count value $C_D$, and the maximum count value $C_M$ 206 according to Equation 2 below.

$$L = INT\left(\frac{C_D}{C_M}\right) = INT\left(\frac{T_D}{T_L}\right) \qquad \text{Equation 2}$$

As shown in Equation 2, the number of loops value L may be determined by dividing the delay count value $C_D$ by the maximum count value $C_M$ 206 and rounding the result to the nearest integer value. Alternatively, the number of loops value L may also be determined by dividing the delay time value $T_D$ by the loop period value $T_L$ 204 and rounding the result to the nearest integer value.

The remaining count value $C_R$ may be determined based on the delay count value $C_D$, the number of loops value L, and the maximum count value $C_M$ 206 according to Equation 3 below.

$$C_R = C_D - L \cdot C_M = \left(\frac{T_D}{T_L} - L\right) \cdot C_M \qquad \text{Equation 3}$$

As shown in Equation 3, the remaining count value $C_R$ may be determined by multiplying the number of loops value L by the maximum count value $C_M$ 206 and subtracting the result from the delay count value $C_D$. Alternatively, the remaining count value $C_R$ may also be determined by subtracting the number of loops value L from the quotient of the delay time value $T_D$ divided by the loop period value $T_L$ 204 and multiplying the result by the maximum count value $C_M$ 206.

A first previous count value is then initialized (block 408) by, for example, setting the previous count value $C_P$ 302 (FIG. 3) equal to the initial count value $C_I$ and storing the previous count value $C_P$ 302 in the previous count variable value $X_{CP}$. The timer/counter 102 (FIG. 1) is then polled and the current count value $C_C$ 304 (FIG. 3) is read from the timer/counter 102 (block 410) and stored in the current count variable value $X_{CC}$. A comparison of the current count variable value $X_{CC}$, the initial count value $C_I$, and the previous count variable value $X_{CP}$ is then performed (block 412) to determine if a loop of the timer/counter 102 has completed.

If the previous count variable value $X_{CP}$ is less than the initial count value $C_I$ and the initial count value $C_I$ is less than or equal to the current count variable value $X_{CC}$ (i.e., $X_{CP} < C_I \leq X_{CC}$), a rollover event is detected and the number of loops value L is decremented (block 414). After decrementing the number of loops value L at block 414, or if the previous count variable value $X_{CP}$ is not less than the initial count value $C_I$, and/or the initial count value $C_I$ is not less than or equal to the current count variable value $X_{CC}$ at block 412, control is passed to block 416. At block 416, the previous count value $C_P$ 306 (FIG. 3) is set equal to the current count value $C_C$ 304 and stored in the previous count variable value $X_{CP}$.

A zero test is then performed on the number of loops value L (block 418) to determine if the number of loops value L is greater than zero. If the number of loops value L is greater than zero, control is passed back to block 410. On the other hand, if the number of loops value L is not greater than zero at block 418, another current count value $C_C$ is obtained (block 420) and stored in the current count variable value $X_{CC}$.

A comparison is made to determine if the current count variable value $X_{CC}$ is less than the initial count value $C_I$ (block 422). If the current count variable value $X_{CC}$ is less than the initial count value $C_I$, the current count variable value $X_{CC}$ is updated by adding the current count variable value $X_{CC}$ to the maximum count value $C_M$ and storing the result in the current count variable value $X_{CC}$ (i.e., $X_{CC=XCC+CM}$) (block 424).

After the current count variable value $X_{CC}$ is updated (block 424) or if it is determined at block 422 that the current count variable value $X_{CC}$ is not less than the initial count value $C_I$, a comparison is made to determine if the delay time has been reached based on the current count variable value $X_{CC}$, the initial count value $C_I$, and the remaining count value $C_R$ (block 426). If it is determined at block 426 that the current count variable value $X_{CC}$ minus the initial count value $C_I$ is less than the remaining count value $C_R$ (i.e., $(X_{CC}-C_I)<C_R$), control is passed back to block 420. However, if it is determined at block 426 that the current count variable value $X_{CC}$ minus the initial count value $C_I$ is not less than the remaining count value $C_R$, the desired delay time has been reached.

Figure 5:
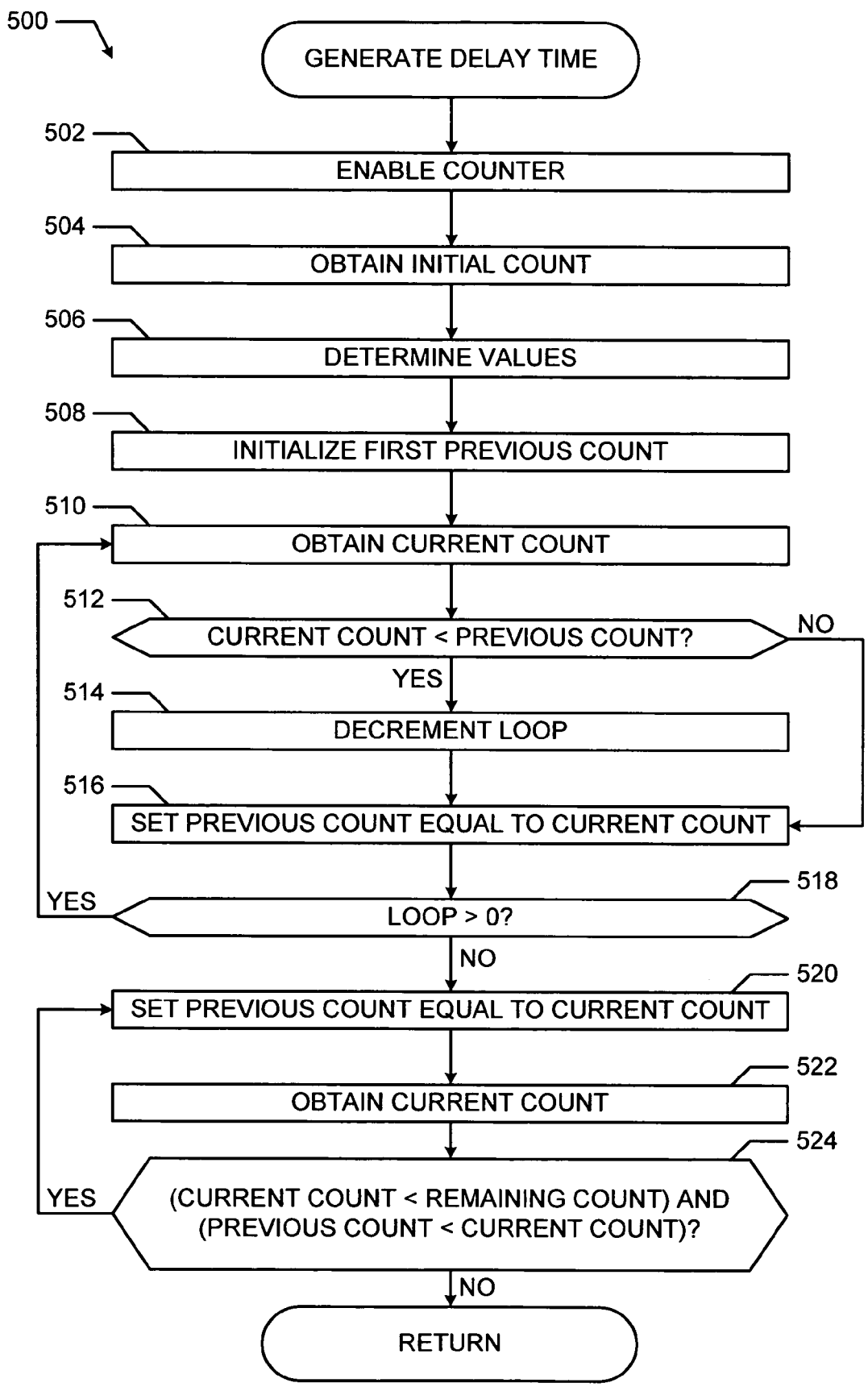
FIG. 5 is a flow diagram of another example delay time generation method that may be implemented by the example system of FIG. 1.

FIG. 5 is a flow diagram of another example delay time generation method 500 that may be implemented by the example system 100 of FIG. 1. The example delay time generation method 500 may be performed during a pre-boot phase or initialization process (i.e., in a non-interrupt environment) and/or during any other runtime phase. The example delay time generation method 500 may be used to generate a desired delay time by determining delay time generation values based on an initial count value (e.g., the initial count value $C_I$ described in greater detail in connection with FIG. 4 above). More specifically, the initial count value $C_I$ may be used to determine a delay count value $C_D$, a number of loops value L, and a remaining count value $C_R$ as described in connection with Equations 4-6 below. Furthermore, the desired delay time may be generated by the example delay time generation method 500 based on the delay time generation values, the loop period value $T_L$ 204 (FIG. 2), and the maximum count value $C_M$ 206 (FIG. 2), and the count variable values $X_{CP}$ and $X_{CC}$ (FIG. 3).

Now turning in detail to the example delay time generation method 500 of FIG. 5, a timer/counter (e.g., the timer/counter 102 of FIG. 1) is enabled (block 502), thereby causing the timer/counter 102 to run or begin incrementing count values. The initial count value $C_I$ is obtained by reading the running count value of the timer/counter 102 (block 504). The delay time generation values, including the delay count value $C_D$, the number of loops value L, and the remaining count value $C_R$ are then determined (block 506) by, for example, the value generator 110 (FIG. 1).

The delay count value $C_D$ may be determined based on the delay time value $T_D$, the loop period value $T_L$ 204, the maximum count value $C_M$ 206, and the initial count value $C_I$ according to Equation 4 below.

$$C_D = \left(\frac{T_D}{T_L} \cdot C_M\right) + C_I \qquad \text{Equation 4}$$

As shown in Equation 4, the delay count value $C_D$ may be determined by dividing the delay time value $T_D$ by the loop period value $T_L$ 204, multiplying the result by the maximum count value $C_M$ 206, and adding the result to the initial count value $C_I$.

In general, the number of loops value L is determined based on the delay count value $C_D$ and the maximum count value $C_M$ 206 according to Equation 5 below.

$$L = INT\left(\frac{C_D}{C_M}\right) = INT\left(\frac{T_D}{T_L} + \frac{C_I}{C_M}\right) \qquad \text{Equation 5}$$

As shown in Equation 5, the number of loops value L may be determined by dividing the delay count value $C_D$ by the maximum count value $C_M$ 206 (FIG. 2) and rounding the result to the nearest integer value. Alternatively, the number of loops value L may also be determined by dividing the delay time value $T_D$ by the loop period value $T_L$ 204, adding the result to the quotient of the initial count value $C_I$ divided by the maximum count value $C_M$ 206, and rounding the result to the nearest integer value.

The remaining count value $C_R$ may be determined based on the delay count value $C_D$, the number of loops value L, and the maximum count value $C_M$ 206 according to Equation 6 below.

$$C_R = C_D - L \cdot C_M = \left(\frac{T_D}{T_L} - L\right) \cdot C_M + C_I \qquad \text{Equation 6}$$

As shown in Equation 6, the remaining count value $C_R$ may be determined by multiplying the number of loops value L by the maximum count value $C_M$ 206 and subtracting the result from the delay count value $C_D$. Alternatively, the remaining count value $C_R$ may be determined by adding the initial count value $C_I$ to the product of the maximum count value $C_M$ 206 and the quantity of the number of loops value L subtracted from the quotient of the delay time value $T_D$ divided by the loop period value $T_L$ 204.

A first previous count value is then initialized (block 508) by, for example, setting the previous count value $C_P$ 302 (FIG. 3) equal to the initial count value $C_I$ and storing the previous count value $C_P$ 302 in the previous count variable value $X_{CP}$. A current count value $C_C$ 304 (FIG. 3) is read from the timer/counter 102 (block 510) and stored in the current count variable value $X_{CC}$. The current count variable value $X_{CC}$ is compared to the previous count variable value $X_{CP}$ (block 512) to determine if a loop of the timer/counter 102 has been completed.

If the current count variable value $X_{CC}$ is less than the previous count variable value $X_{CP}$ (i.e., $X_{CC<XCP}$), a rollover event is detected and the number of loops value L is decremented (block 514). After decrementing the number of loops value L at block 514, or if the current count variable value $X_{CC}$ is not less than the previous count variable value $X_{CP}$ at block 512, control is passed to block 516. At block 516, a previous count value $C_P$ 306 (FIG. 3) is set equal to the current count value $C_C$ 304 (FIG. 3) and stored in the previous count variable value $X_{CP}$.

A zero test is then performed on the number of loops value L (block 518) to determine if the number of loops value L is greater than zero. If the number of loops value L is greater than zero, control is passed back to block 510. On the other hand, if the number of loops value L is not greater than zero, the previous count value $C_P$ 306 (FIG. 3) is set equal to the current count value $C_C$ 304 (FIG. 3) and stored in the previous count variable value $X_{CP}$ (block 520). Another current count value $C_C$ is then obtained (block 522) and stored in the current count variable value $X_{CC}$.

The current count variable value $X_{CC}$ is then compared to the remaining count value $C_R$ and the previous count variable value $X_{CP}$ (block 524). If the current count variable value $X_{CC}$ is less than the remaining count value $C_R$ and the previous count variable value $X_{CP}$ is less than the current count variable value $X_{CC}$ (i.e., $X_{CC<CR}$ and $X_{CP}<X_{CC}$) control is passed back to block 520. However, if the current count variable value $X_{CC}$ is not less than the remaining count value $C_R$ and/or the previous count variable value $X_{CP}$ is not less than the current count variable value $X_{CC}$, the desired delay time has been reached.

Figure 6:
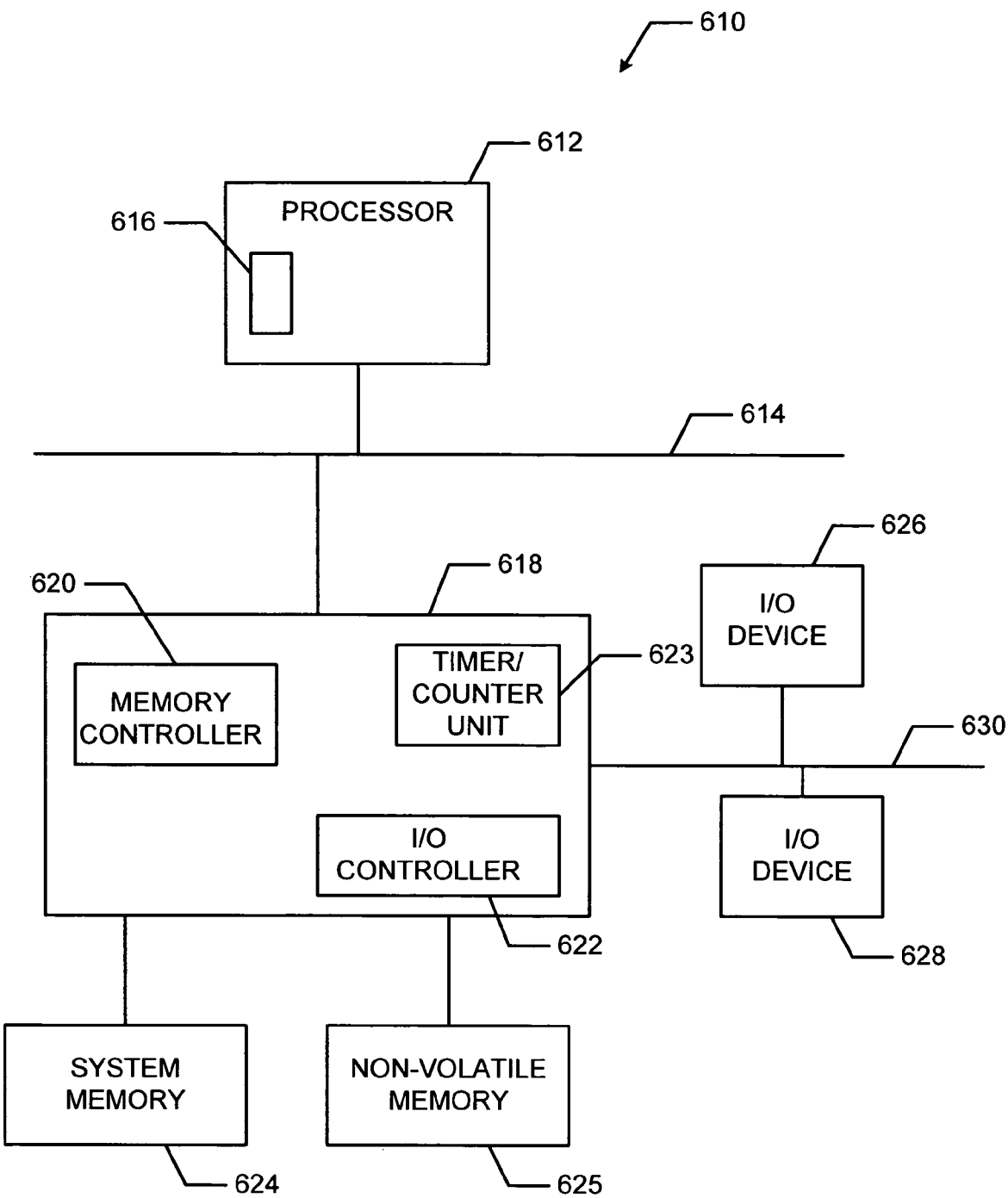
FIG. 6 is a block diagram of an example processor system that may be used to implement the apparatus, methods, and articles of manufacture described herein.

FIG. 6 is a block diagram of an example processor system 610 that may be used to implement the apparatus, methods, and articles of manufacture described herein. As shown in FIG. 6, the processor system 610 includes a processor 612 that is coupled to an interconnection bus or network 614. The processor 612 includes a register set or register space 616, which is depicted in FIG. 6 as being entirely on-chip, but which could alternatively be located entirely or partially off-chip and directly coupled to the processor 612 via dedicated electrical connections and/or via the interconnection network or bus 614. The processor 612 may be any suitable processor, processing unit or microprocessor such as, for example, a processor from the Intel X-Scale™ family, the Intel Pentium™ family, etc. Although not shown in FIG. 6, the processor system 610 may be a multi-processor system and, thus, may include one or more additional processors that are identical or similar to the processor 612 and which are coupled to the interconnection bus or network 614.

The processor 612 of FIG. 6 is coupled to a chipset 618, which includes a memory controller 620, an input/output (I/O) controller 622, and a timer/counter unit 623. As is well known, a chipset typically provides I/O and memory management functions as well as a plurality of general purpose and/or special purpose registers, timers, etc. that are accessible or used by one or more processors coupled to the chipset. The memory controller 620 performs functions that enable the processor 612 (or processors if there are multiple processors) to access a system memory 624 and a non-volatile memory 625.

The system memory 624 may include any desired type of volatile memory such as, for example, static random access memory (SRAM), dynamic random access memory (DRAM), etc. The non-volatile memory 625 may include any desired type of non-volatile memory such as flash memory or read only memory (ROM). Furthermore, pre-boot system initialization instructions that form part of a basic input output system (BIOS) or an EFI may be stored on the non-volatile memory 625 for access during a pre-boot system initialization process (i.e., prior to an operating system boot process).

The I/O controller 622 performs functions that enable the processor 612 to communicate with peripheral input/output (I/O) devices 626 and 628 via an I/O bus 630. The I/O devices 626 and 628 may be any desired type of I/O device such as, for example, a keyboard, a video display or monitor, a mouse, etc.

The timer/counter unit 623 may be substantially similar or identical to the timer/counter 102 of FIG. 1 and may be used during a runtime phase of the processor system 610 to implement delay times and/or timed system events. The timer/counter unit 623 may also include an Advanced Configuration and Power Interface (ACPI) timer and/or a non-resetable timer. The ACPI timer may be configured to function during a pre-boot processor system initialization process.

While the memory controller 620, the I/O controller 622 and the timer/counter unit 623 are depicted in FIG. 6 as separate functional blocks within the chipset 618, the functions performed by these blocks may be integrated within a single semiconductor circuit or may be implemented using two or more separate integrated circuits.

The methods described herein may be implemented using instructions that are stored on a computer readable medium and executed by the processor 612. The computer readable medium may include any desired combination of solid state, magnetic and/or optical media implemented using any desired combination of mass storage devices (e.g., disk drive), removable storage devices (e.g., floppy disks, memory cards or sticks, etc.), and/or integrated memory devices (e.g., random access memory, flash memory, etc.).

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for generating a delay time by a processor system, comprising:

determining a number of loops value associated with a delay time and at least one characteristic value associated with a counter, wherein the number of loops value represents a number of counter rollover events;

storing the number of loops value in a memory;

determining a count value based on the number of loops value, wherein the count value is representable by the counter;

obtaining a current count value from the counter using a count reader and performing a comparison based on the current count value and a previous count value at least a number of times equal to the number of loops value; and generating the delay time with the counter based on the number of loops value and the count value.

2. A method as defined in claim 1, further comprising determining that the delay time has been reached based on the comparison.

3. A method as defined in claim 1, wherein obtaining the current count value comprises reading a running count value of the counter.

4. A method as defined in claim 1, further comprising obtaining an initial count value.

5. A method as defined in claim 4, wherein determining the number of loops value comprises determining the number of loops value based on at least the initial count value.

6. A method as defined in claim 4, wherein determining the count value comprises determining the count value based on at least the initial count value.

7. A method as defined in claim 1, further comprising polling the counter.

8. A method as defined in claim 7, wherein polling the counter comprises polling the counter in a non-interrupt environment.

9. A method as defined in claim 1, wherein the at least one characteristic value is an amount of time required for the counter to count between a minimum count value of the counter and a maximum count value of the counter.

10. A method as defined in claim 1, wherein generating the delay time comprises generating the delay time prior to a boot process.

11. A method as defined in claim 1, wherein generating the delay time comprises generating the delay time in a pre-boot environment without the use of interrupts.

12. An apparatus for generating a delay time comprising:
a processor system including a memory; and
instructions stored in the memory that enable the processor system to:
   determine a number of loops value associated with a delay time and at least one characteristic value associated with a counter, wherein the number of loops value represents a number of counter rollover events;
   store the number of loops value in at least one of the memory or a second memory;
   determine a count value based on the number of loops value, wherein the count value is representable by the counter;
   obtain a current count value and perform a comparison based on the current count value and a previous count value at least a number of times equal to the number of loops value; and
   generate the delay time with the counter based on the number of loops value and the count value.

13. An apparatus as defined in claim 12, wherein the instructions stored in the memory enable the processor system to determine that the delay time has been reached based on the comparison.

14. An apparatus as defined in claim 12, wherein the instructions stored in the memory enable the processor system to obtain an initial count value.

15. An apparatus as defined in claim 14, wherein the instructions stored in the memory enable the processor system to determine the number of loops value based on at least the initial count value.

16. An apparatus as defined in claim 12, wherein the instructions enable the processor system to poll the counter in a non-interrupt environment.

17. An apparatus as defined in claim 12, wherein the at least one characteristic value is an amount of time required for the counter to count between a minimum count value of the counter and a maximum count value of the counter.

18. An apparatus as defined in claim 12, wherein the instructions enable the processor system to generate the delay time prior to a boot process.

19. An apparatus as defined in claim 12, wherein the memory is at least one of a flash memory or a read only memory.

20. An apparatus as defined in claim 12, wherein the instructions enable the processor system to generate the delay time in a pre-boot environment without the use of interrupts.

21. A system for generating a delay time comprising:
a counter;
a count reader to obtain count values from the counter;
a comparator communicatively coupled to the count reader and to perform comparisons based on at least some of the count values;
a loop counter communicatively coupled to the comparator and to modify a number of loops value stored in a memory based on at least some of the comparisons, wherein the number of loops value represents a number of counter rollover events associated with a delay time and at least one characteristic value associated with the counter, wherein the system generates a delay time based on the comparisons, the number of loops value, and the at least some of the count values by obtaining a current count value of the counter via the count reader, performing a comparison via the comparator based on the current count value and a previous count value at least a number of times equal to the number of loops value, and wherein at least one of the counter, the count reader, the comparator, and the loop counter is implemented using a hardware circuit.

22. A system as defined in claim 21, wherein the count reader is further to obtain an initial count value.

23. A system as defined in claim 22, further comprising a value generator that is to generate at least one of the count values and the number of loops value based on the initial count value.

24. A system as defined in claim 21, wherein the counter is at least one of a non-resetable counter or a non-resetable timer.

25. A system as defined in claim 21, wherein the system is to generate the delay time in a non-interrupt environment.

26. A system as defined in claim 21, wherein the system is to generate the delay time prior to a boot phase.

27. A system as defined in claim 21, wherein the system is to generate the delay time in a pre-boot environment without the use of interrupts.

28. A computer readable medium having instructions stored thereon that, when executed, cause a machine to:
   determine a number of loops value associated with a delay time and at least one characteristic value associated with a counter, wherein the number of loops value represents a number of counter rollover events;

store the number of loops value in a memory;

determine a count value based on the number of loops value, wherein the count value is representable by the counter;

obtain a current count value and perform a comparison based on the current count value and a previous count value at least a number of times equal to the number of loops value: and generate the delay time with the counter based on the number of loops value and the count value.

29. A computer readable medium as defined in claim 28 having instructions stored thereon that, when executed, cause the machine to determine that the delay time has been reached based on the comparison.

30. A computer readable medium as defined in claim 28 having instructions stored thereon that, when executed, cause the machine to obtain an initial count value.

31. A computer readable medium as defined in claim 30 having instructions stored thereon that, when executed, cause the machine to determine the number of loops value based on at least the initial count value.

32. A computer readable medium as defined in claim 30 having instructions stored thereon that, when executed, cause the machine to determine the count value based on at least the initial count value.

33. A computer readable medium as defined in claim 28 having instructions stored thereon that, when executed, cause the machine to poll the counter.

34. A computer readable medium as defined in claim 28 having instructions stored thereon that, when executed, cause the machine to poll the counter in a non-interrupt environment.

35. A computer readable medium as defined in claim 28 having instructions stored thereon that, when executed, cause the machine to decrement the number of loops value based on at least one rollover event of the counter.

36. A computer readable medium as defined in claim 28 having instructions stored thereon that, when executed, cause the machine to generate the delay time prior to a boot process.

37. A computer readable medium as defined in claim 28 having instructions stored thereon that, when executed, cause the machine to generate the delay time in a pre-boot environment without the use of interrupts.

38. An apparatus for generating a delay time comprising:

a processor system including a flash memory; and instructions stored in the flash memory that enable the processor system to:

determine a number of loops value associated with a delay time and at least one characteristic value associated with a counter, wherein the number of loops value represents a number of counter rollover events;

store the number of loops value in at least one of the flash memory or a second memory;

determine a count value based on the number of loops value, wherein the count value is representable by the counter;

obtain a current count value and performing a comparison based on the current count value and a previous count value at least a number of times equal to the number of loops value; and generate the delay time with the counter based on the number of loops value and the count value.

39. An apparatus as defined in claim 38, wherein the instructions enable the processor system to generate the delay time prior to a boot process.

40. An apparatus as defined in claim 38, wherein the instructions enable the processor system to generate the delay time in a pre-boot environment without the use of interrupts.

* * * * *